March 19, 1935.　　　H. O. PUTT　　　1,994,620
THERMOSTATIC BULB RELAY
Filed March 19, 1932
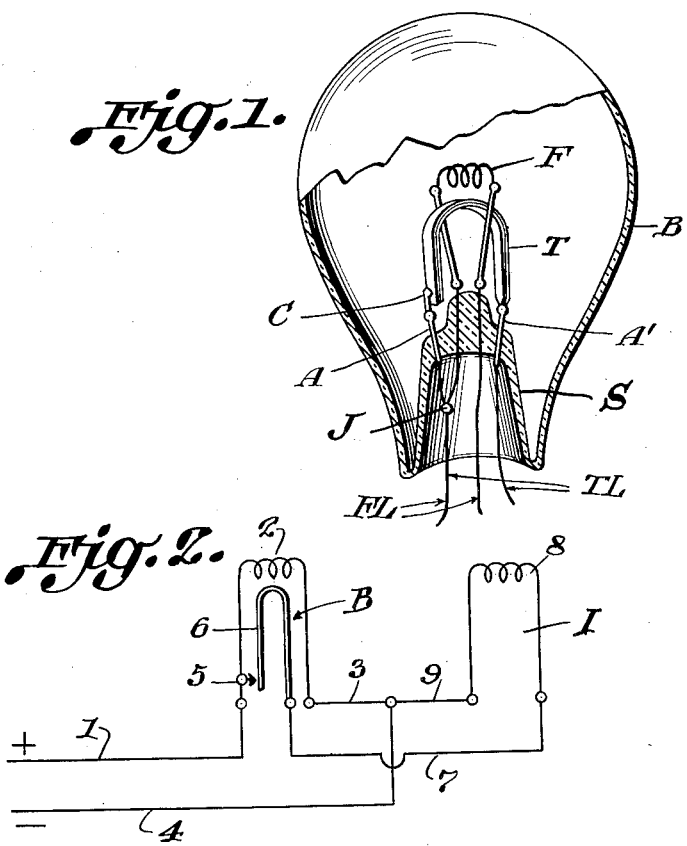
Inventor
Harlie O. Putt
by Lester L. Sargent
Atty.

Patented Mar. 19, 1935

1,994,620

UNITED STATES PATENT OFFICE 1,994,620

THERMOSTATIC BULB RELAY

Earlie O. Putt, Elkhart, Ind.

Application March 19, 1932, Serial No. 600,010

2 Claims. (Cl. 176—14)

My invention relates to thermostatic or heat-operated relays, and consists in incorporating a suitable thermostatic element or elements within an evacuated incandescent bulb of the conventional type or of special construction and within suitable distance from the filament or heater element of said bulb so that the waste heat from said filament or heater element will act directly on said thermostatic element or elements to cause same to function in a manner well known to those skilled in the art, and hereinafter more fully described.

It is an especial object of my invention to provide the novel combination of a thermostatic element or elements and filament or heater element within an evacuated bulb or tube, either of the conventional incandescent type or of special design, and so relatively positioned as to cause the thermostatic element or elements to operatively function by means of the radiated heat of said filament or heater element without interference with the illuminating factor of said filament.

It is also the object of my invention to provide the novel combination of a thermostatic element and incandescent filament within an evacuated bulb or tube and so relatively positioned as to cause the thermostatic element to operatively function only at temperatures considerably above maximum atmospheric temperatures and to remain practically unaffected by normal atmospheric temperature fluctuations.

Another primary object of my invention is to provide a thermostatic structure which operatively functions on the waste heat energy of an incandescent bulb filament, to effect control of a secondary circuit or circuits, thereby eliminating the necessity of employing external means such as electro-magnetic devices to effect such control, and at the same time eliminating the energy losses of such external devices together with all of their faults and complications.

It is also an especial object of my invention to provide a thermostatic bulb relay that will operatively function on relatively low filament wattages, such as the automotive and miniature types commonly in use.

It is my further object to provide a new device capable of relatively wide application in the art, by combining two well-known elements in such manner as to effect increased efficiency, dependability, simplicity and economy.

It is understood that while I illustrate and describe a single thermostatic element and contact, that I anticipate the employment of a plurality of thermostatic elements and contacts, and may alter their respective form and arrangement without departing from the spirit and purpose of the invention.

I attain the objects of my invention by the means illustrated in the accompanying drawing, in which—

Figure 1 is a vertical section through the thermostatic bulb relay, showing the preferred position and form of the thermostatic elements;

Fig. 2 is a diagram of a circuit illustrating how one thermostatic bulb relay is utilized as the main illuminating bulb and so connected to an ordinary incandescent bulb and current supply as to cause the ordinary or emergency bulb to light when the filament of the thermostatic bulb burns out;

As previously stated, the purpose of my invention is to provide a thermostatic relay which will be practically unaffected by natural changes in atmospheric temperatures, thereby obtaining a practically uniform operating characteristic regardless of natural temperature variations.

I accomplish the foregoing advantages by employing a thermostatic element having a relatively high temperature operating co-efficient and locating it relatively near the heat producing element or filament of an evacuated enclosure such as an incandescent bulb. The temperature of the filament or heater and the temperature co-efficient of the thermostatic element will determine their relative proximity for the desired functional result. The relative proximity of these two elements under a given temperature condition will also determine the "time lag" of the thermostatic element, hence it will be seen that practically any desired "time lag" factor may be obtained within the physical limits of the elements employed and their relative arrangement.

For instance, with reference to Fig. 1, assume the filament F draws 5 watts and the top bend of the thermostatic element is close enough to said filament to receive a maximum amount of heat energy therefrom, and assume the expansion co-efficient of said thermostatic element is designed to function in this temperature, it is obvious then that the thermostatic element will require a certain element of time to distort sufficiently under this temperature to "open" its contact C. Assume this time element is one second. Now if the space between said filament and said thermostatic element is increased, or if the temperature of the filament is reduced, the time lag will be increased. However, a thermostatic expansion co-efficient may be selected that will function with the first mentioned time factor at this increased distance from the filament.

The preferred form and position of the thermostatic element as illustrated in Fig. 1 permits the use of the highest possible thermostatic temperature co-efficient compatible with extremely low wattage filaments, such as used in miniature bulbs, and as the thermostatic element itself has practically no resistance, there are no energy losses of any consequence involved within itself. Once adjusted and sealed in, it is immune to dust, moisture, corrosion and atmospheric conditions.

Referring to Fig. 1 of the drawing, there is illustrated an evacuated bulb B having a glass stem S. I provide filament lead-in wires FL and thermostatic lead-in wires TL. I provide a suitable thermal element or thermostat T bent in inverted U-form, one end of which is electrically connected to a suitable lead-in wire A' sealed in the glass stem S, while the opposite end is free to move into and out of contact with the contact element C of the fixed wire A.

The fixed wire A which is mounted in the glass stem S is electrically connected at J to the filament lead-in wire FL, as shown in Fig. 1. In the form of the invention illustrated in Fig. 1, the circuit is normally closed through the contact C and thermostat T. The thermal element T is preferably made of relatively high temperature co-efficient thermal metal compatible with the temperature to which it may be subjected. This thermostatic element T is so disposed as to cause it to open its contact at C when heated and to close said contact when cooled. It will be understood that this thermostatic element T may be so disposed and formed as to operate in the reverse of the above arrangement if it is so desired; that is, it may be arranged to close or contact when heated and to open when cooled.

It will be observed that the thermostatic element is suitably anchored at one end to the lead-in wire A', as is also the respective contact to the lead-in wire A. This anchorage must be firm and secure enough to insure stability after once positioned. The thermostatic element in this case takes the form of an inverted U with the bend under the filament and relatively close thereto and its free end resting against its respective contact with a predetermined pressure. This contact also acts as a stop in the normal position of the thermostatic element. As previously explained, the proximity of this element T to the filament is determined by the energy consumption of said filament and the temperature co-efficient of the thermostatic element in respect to the desired functional characteristics.

While Fig. 1 shows a normally closed contact—that is, the contact is closed when the filament is cold,—it is understood that a normally open contact may be provided simply by forming the U-shaped thermostatic element in the opposite direction. For instance, thermostatic metal is produced by welding two sheets of dissimilar metals together. These sheets may be cut into strips of any desired width and formed up in practically any desired shape and aged or fixed in that form by special treatment. When subjected to heat the metal having the greatest expansion co-efficient will exert force in excess of the other metal. Now if this metal having the greatest expansion effort is on the outside of a loop or turn as in Fig. 1, it will exert a force inwardly when heated, thus causing the contact to be "opened," but if this element is formed so as to place the metal having this greater expansive effort inside the loop or turn, it would expand outwardly under the influence of heat. Thus a normally open or a normally closed contact arrangement may be provided by forming this thermostatic element properly, or by locating the fixed contact inside or outside the free end of the thermostatic element as desired.

Fig. 2 illustrates a diagrammatic circuit arrangement showing how one thermostatic bulb relay is utilized as the main illuminating bulb and so connected to a common incandescent bulb and current supply as to cause the common or emergency bulb to light when the filament of the thermostatic bulb burns out. In Fig. 2 of the drawing, 4 designates the wire through which current is conducted to the wires 3 and 9. The wire 3 leads to the relay filament 2 of bulb B and thence to positive wire 1, and the wire 9 leads to the filament 8 of a common incandescent bulb I, thence by wire 7 to the fixed end of the thermostat 6 of bulb B. Thus it will be noted that when the current is first turned on both bulbs will light, but the heat of the filament 2 in bulb B operates the thermostat 6 and opens the contact 5 in this bulb which extinguishes bulb I. Bulb I therefore remains out until the current is disrupted or until the filament of bulb B burns out, in which event the thermostat 6 cools and closes contact 5, thus lighting emergency bulb I.

There are many potential applications for the device which may be employed advantageously wherever a slight "time lag" is not objectionable; and also in numerous applications where a definite "time lag" in a functional operation is highly desirable.

I anticipate employing a plurality of thermostatic elements within a single bulb, with a single incandescent filament or heater, said thermostatic elements to be disposed as heretofore described and arranged to open or close their respective contacts under the influence of heat radiated by said filament, and said thermostatic elements to have either identical or different time-lag characteristics.

For instance, I may employ a thermostatic element arranged to have its contacts normally closed, and a second thermostatic element arranged to have its contacts normally open; both thermostatic elements to be positioned electrically or conductively separate from each other, that is insulated from each other, so that each element could control two different circuits, namely, closing one circuit and opening another circuit. Both thermostatic elements would be influenced or actuated by the radiated heat from the single filament.

If both thermostatic elements had the same time lag, then one circuit would be closed at the same time that the other circuit opened. If one thermostatic element had a ten second time lag and the other a fifteen second time lag, then one contact would function five seconds earlier than the other.

If say, three thermostatic elements were employed, each element could be made to possess the same time lag and three different isolated circuits could be controlled at the same time; that is, each isolated circuit would have the same time lag. Or each of the three thermostatic elements could possess different time lag factors, so that each of the three separate circuits could function progressively according to the time lag difference involved. In all cases any number of thermostatic elements practical to employ would be actuated by the radiated heat of one single heater or filament. Each thermostatic element would have the same form and would be incorporated in the same manner as the single thermostatic element illustrated in the drawing, namely, anchored to the glass stem of the bulb, but slightly separated from each other.

What I claim is:—

1. A thermostatic bulb relay comprising an evacuated bulb, a low wattage filament constituting a heating element in said bulb, an inverted U-shaped bimetallic thermostat within the bulb and having its U-bend in proximity to the filament, lead-in wires to the filament, lead-in wires to the thermostat, the thermostat having one end fixed and the other end movable to open or close an electric circuit by its operation due to radiated heat of the filament.

2. In a thermostatic bulb relay, the combination of an evacuated bulb, a low wattage filament constituting a heating element in said bulb, an inverted U-shaped bimetallic thermostat within the bulb and having its U-bend in proximity to the filament, lead-in wires to the filament, lead-in wires to the thermostat, the thermostat having one end fixed and the other end movable to open or close an electric circuit by its operation due to radiated heat of the filament, the thermostatic elements of the aforesaid bimetallic thermostat having different time lag characteristics.

HARLIE O. PUTT.